Figure 1:
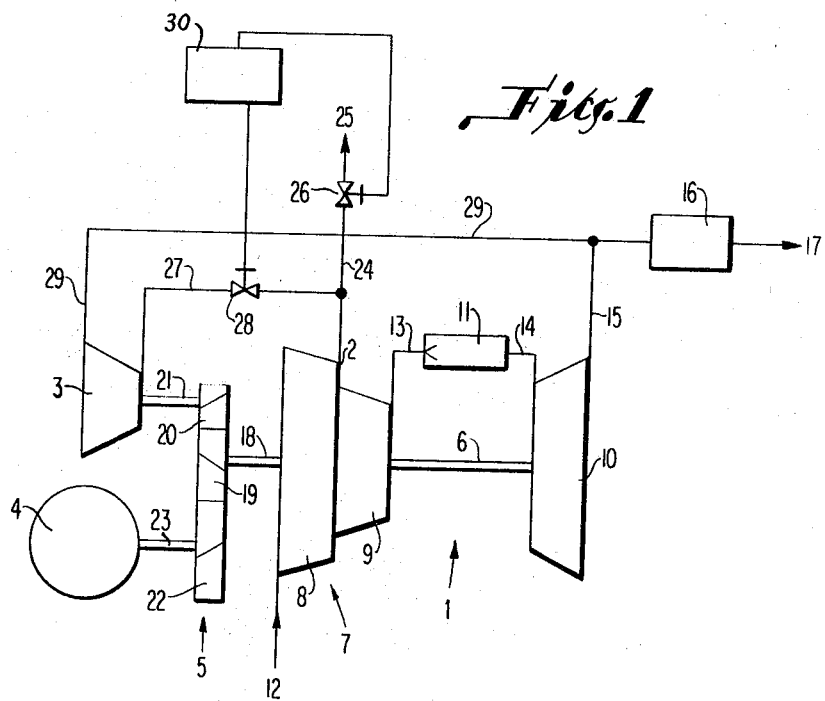

United States Patent
Grieb

[15] 3,659,417
[45] May 2, 1972

[54] GAS TURBINE UNIT FOR GENERATING MECHANICAL ENERGY AND COMPRESSED AIR

[72] Inventor: Hubert J. Grieb, Stuttgart-Botnang, Germany

[73] Assignee: Daimler-Benz Aktiengesellschaft, Stuttgart-Unterturkheim, Germany

[22] Filed: Aug. 8, 1969

[21] Appl. No.: 848,461

[30] Foreign Application Priority Data

Aug. 8, 1968 Germany...................P 17 51 851.3

[52] U.S. Cl. ..........................60/39.07, 60/39.18 C, 98/1.5
[51] Int. Cl. ......................................F02c 7/02, B64d 13/02
[58] Field of Search...................60/39.18, 39.18 B, 39.18 C, 60/102, 39.07; 74/661; 415/27, 28; 417/28, 47, 280, 408; 98/1.5; 244/59

[56] References Cited

UNITED STATES PATENTS

| | | | |
|---|---|---|---|
| 2,618,470 | 11/1952 | Brown | 60/39.07 |
| 2,483,073 | 9/1949 | Strub | 60/39.18 C |
| 2,541,625 | 2/1951 | Webster | 74/661 |
| 2,618,431 | 11/1952 | Walker | 60/39.18 C |
| 3,500,636 | 3/1970 | Craig | 60/39.18 B |

FOREIGN PATENTS OR APPLICATIONS

| | | | |
|---|---|---|---|
| 885,311 | 5/1943 | France | 60/39.18 C |
| 493,174 | 10/1938 | Great Britain | 60/39.18 C |

*Primary Examiner*—Douglas Hart
*Attorney*—Craig, Antonelli & Hill

[57] ABSTRACT

A gas turbine aggregate, especially an auxiliary unit for aircrafts which is intended to produce both mechanical energy and compressed air for loads, and in which a line branching off from the compressed air line that is supplied with compressed air from the compressor, leads to an air turbine which, in its turn, is connected with the output shaft of the gas turbine either directly or indirectly; the branch line from the compressed air line to the air turbine is provided with a valve to enable selective opening and closing of the branch line.

11 Claims, 2 Drawing Figures

PATENTED MAY 2 1972 3,659,417

INVENTOR
HUBERT J. GRIEB

BY
Craig, Antonelli, Stewart & Hill

ATTORNEYS

GAS TURBINE UNIT FOR GENERATING MECHANICAL ENERGY AND COMPRESSED AIR

The present invention relates to a gas turbine aggregate for the production of mechanical energy and compressed air. Such type of aggregates or units are provided with tapping points or places where compressed air is removed, within the area of the compressor housing thereof. Compressed air, that is not needed, is thereby lost by blowing off into the atmosphere. With gas turbine units which frequently have to give off only shaft-power, such as, for example, auxiliary aggregates or units for aircrafts, an uneconomic operation results therefrom.

It is the aim of the present invention to eliminate the losses which result by the un-needed compressed air. This is realized in that from a compressed air line fed by the compressor of the gas turbine branches off a line adapted to be closed and leading to an air turbine which is operatively connected either directly or indirectly with the output shaft of the gas turbine. This permits a far-reaching regaining of the energy of the compressed air supplied by the compressor but not used by the load. The rate of air flow through the compressor and through the following gas turbine sections is not influenced thereby which acts favorably on the operation of the unit.

If the compressed air is not removed downstream of the compressor, then the pressure condition of the gas turbine process adjusts or conforms itself to that of the demanded compressed air. Since the pressure conditions demanded by the load are generally very low, an unfavorable thermodynamic process with high fuel consumption and low specific output results simultaneously therewith from such an arrangement.

These disadvantages are avoided according to the present invention by a gas turbine which includes a multi-stage compressor consisting of a low-pressure section and of a high-pressure section with the compressed air line branching off downstream of the low-pressure section. The air supplied by the high-pressure section to the gas turbine thereby possesses a pressure condition or pressure ratio that is higher and therewith favorable from the point of view of thermodynamics of the drive unit, which is independent of that of the given-off compressed air. An optimum thermodynamic cycle process can be determined thereby which results in a minimum fuel consumption and a high specific output. Furthermore, as a result thereof, slight structural expenditures in relation to the output can be achieved thereby.

A particularly advantageous aggregate results according to the present invention by a transmission consisting of at least two spur gear wheels which mesh with a third spur gear whereby the output shaft of the gas turbine and the drive shaft of a working machine, for example, of a current-generator, are connected with one gear each of the transmission. In this manner, the rotational speed of the air turbine can be so selected that the air turbine operates with a high efficiency. Furthermore, by the selection of the transmission ratio a suitable rotational speed for the working machine or load can be determined.

Accordingly, it is an object of the present invention to provide a gas turbine aggregate of the type described above which eliminates by simple means the aforementioned shortcomings and drawbacks encountered in the prior art.

Another object of the present invention resides in a gas turbine unit, especially an auxiliary unit, which assures economical operation under all operating conditions.

A further object of the present invention resides in a gas turbine unit intended to produce shaft-power as well as compressed air, in which the loss of energy in case of non-use of the compressed air is minimized.

Still a further object of the present invention resides in a gas turbine unit of the type described above in which the rate of air flow through the compressor and the following gas turbine section is not influenced by the changes in load in the compressed air line.

Another object of the present invention resides in a gas turbine unit which not only assures low fuel consumption and high specific output but also a cycle with optimum theremodynamic conditions.

Figure 2:
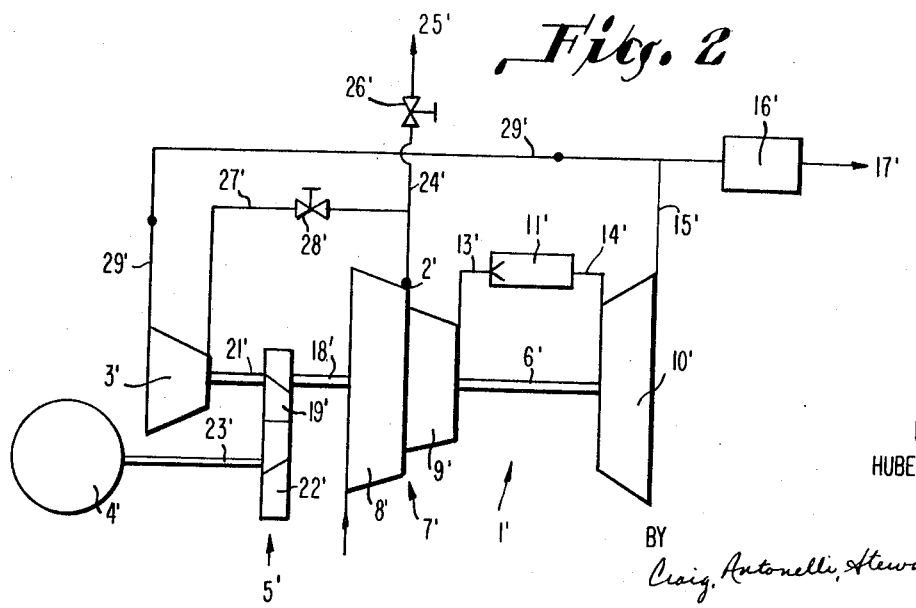

These and further objects, features and advantages of the present invention will become more obvious from the following description when taken in connection with the accompanying drawings which show, for purposes of illustration only, embodiments in accordance with the present invention, and wherein:

FIG. 1 is a schematic view of a gas turbine aggregate in accordance with the present invention; and FIG. 2 is a schematic view similar to FIG. 1 but showing a second embodiment in accordance with the present invention.

Referring now to the drawings, the gas turbine unit is essentially composed of a gas turbine generally designated by reference numeral 1 with a place 2 for the removal of the compressed air, of an air turbine 3, of a current generator or similar load 4 and of a multi-input gear assembly generally designated by reference numeral 5.

The gas turbine is constructed as single-shaft turbine. A compressor generally designated by reference numeral 7 with a low-pressure section 8 and a high-pressure section 9 as well as a turbine 10 are secured on the shaft 6. Reference numeral 11 designates the combustion chamber with conventional fuel injection and ignition devices. An arrow 12 indicates the air inflow at the input of the compressor 7. Reference numerals 13 and 14 designate channels which connect the output of the compressor 7 with the combustion chamber 11 and the combustion chamber 11 with the inlet of the turbine 10. A line 15 leads from the turbine 10 to a silencer or muffler 16 from which the gases flow into the atmosphere in the direction of the arrow 17.

A gear wheel 19 of the common, multiple input transmission 5 is mounted on the output shaft 18 of the gas turbine 1. A gear wheel 20 which is secured on the output shaft 21 of the air turbine 3 meshes with the gear wheel 19. A further gear wheel 22 which together with the gear wheel 19 forms a speed reduction, is mounted on the input shaft 23 of the current generator 4 which supplies the power supply of the aircraft with current.

A line 24 leads from the tapping point 2 for the compressed air, which is arranged downstream of the low-pressure section 8 of the compressor 7 in the direction of the arrow 25 to one or several loads. A conventional valve 26 serves for the adjustment of the desired rate of air flow through or for the closing of the line 24 if no compressed air is required. A line 27 for the compressed air branches off from the line 24 and leads to the air turbine 3. A conventional valve 28 serves for the opening or closing of the line 27. A line 29 for the relieved air starts from the outlet of the air turbine 3 and terminates upstream of the muffler 16 in the line 15 for the exhaust gases.

During the operation of the gas turbine unit, a constant quantity of compressed air is produced continuously with a predetermined rotational speed and is supplied to the load, for example, to a starter installation or to a cabin heating installation. If the demand of compressed air decreases, then the through-flow quantity is decreased by means of the valve 26 and the valve 28 is simultaneously opened correspondingly by any conventional known means 30. The excess compressed air then flows through the line 27 to the air turbine 3 and produces work in the air turbine 3. The output of the air turbine 3 is transmitted by way of the output shaft 21 to the common multiple input gear 5 and is therefore rendered useful. The air relieved in the air turbine 3 is admixed to the exhaust gases of the turbine 10 and reaches the atmosphere by way of the silencer or muffler 16.

The gas turbine unit according to the present invention permits the full utilization of the compressed air energy under all types of operations. The independence of the gas turbine process from the compressed air operation thereby enables additionally a high thermal efficiency so that a particularly economic gas turbine unit results.

The low-pressure section and the high-pressure section of the compressor, the gas turbine and the air turbine may be, depending on the design, either of single stage or multi-stage construction of the axial or also of the radial type.

The transmission 5 may also be of any known conventional construction. The individual gear wheels thereof may be arranged in the transmission 5 in various ways. For example, the gas turbine gear and the air turbine gear may be in meshing engagement with the generator gear. Differing transmission ratios, possibly by the arrangement of intermediate stages or intermediate transmission ratios may be utilized between the individual transmission shafts. Additional shafts, for example, for the drive of an oil pump, may be provided in the common transmission 5. Furthermore, it is also possible to provide separating clutches, for example, in order to be able to stop during pure compressed air operation the generator and the air turbine. The embodiment shown in FIG. 2 has similar parts designated by like numerals which are primed. In this embodiment, however, the output shaft 21' of the air turbine 3' is directly connected with the output shaft 6' of the gas turbine 10'.

Thus, while I have shown and described only these embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are within the scope of those skilled in the art.

I claim:

1. A gas turbine aggregate, especially an auxiliary aggregate for the production of mechanical energy and compressed air for aircraft; said aggregate comprising: compressor means, an output shaft, compressed air line means fed by said compressor means and being operatively connected with load means, branch line means operable to be closed and branching off from the compressed air line means, the branch line means leading to an air turbine means, and connecting means operatively connecting the air turbine means with the output shaft of the gas turbine, said connecting means including transmission means operatively connecting the output shaft of the gas turbine and the output shaft of the air turbine means with an input shaft of a rotating load, said transmission means including at least two gears which mesh with a third gear, the output shaft of the gas turbine and the output shaft of the air turbine means and the input shaft of the load are connected with a respective gear.

2. A gas turbine aggregate according to claim 1, wherein said rotating load is an electric generator.

3. A gas turbine aggregate according to claim 1, wherein said compressed air line means is operatively connected to said load means via first valve means for selectively adjusting the desired air flow rate through said compressed air line means.

4. A gas turbine aggregate according to claim 3, wherein second valve means is arranged in said branch line means for the selective opening or closing thereof, whereby when the demand for compressed air by said load means decreases, said first valve means will decrease the air flow rate through said compressor line means and said second valve means will be simultaneously opened so that compressed air flows through said branch line means.

5. A gas turbine aggregate according to claim 4, characterized in that the compressor means is a multi-stage compressor including a low pressure section and a high pressure section, said compressed air line means branching off downstream of the low-pressure section.

6. A gas turbine aggregate according to claim 1, characterized in that said third gear is connected to the gas turbine output shaft.

7. A gas turbine aggregate according to claim 1, characterized in that an exhaust line means leading away from the outlet of the air turbine means is provided, said exhaust line means being separate from said compressed air line means so that the exhaust from the air turbine means is not connected with said load means, and in that said exhaust line means leads to a low pressure atmosphere such as the exterior of an airplane flying at high altitudes.

8. A gas turbine aggregate according to claim 7, characterized in that the compressor means is a multi-stage compressor including a low-pressure section and a high-pressure section, the compressed air line means branching off downstream of the low-pressure section.

9. A gas turbine aggregate, especially an auxiliary aggregate for the production of mechanical energy and compressed air for aircraft; said aggregate comprising: compressor means, an output shaft, compressed air line means fed by said compressor means and being operatively connected with load means, said compressor means being a multi-stage compressor including a low-pressure section and a high-pressure section, the compressed air line means branching off downstream of the low-pressure section, branch line means operable to be closed and branching off from the compressed air line means, the branch line means leading to an air turbine means, and connecting means operatively connecting the air turbine means with the output shaft of the gas turbine, said connecting means including transmission means operatively connecting the output shaft of the gas turbine and the output shaft of the air turbine means with an input shaft of a rotating load, said transmission means including at least two gears which mesh with a third gear, the output shaft of the gas turbine and the output shaft of the air turbine means and the input shaft of the load are connected with a respective gear.

10. A gas turbine aggregate according to claim 9, wherein said rotating load is an electric generator.

11. A gas turbine aggregate according to claim 9, characterized in that said third gear is connected to the gas turbine output shaft.

* * * * *